United States Patent [19]

Seto et al.

[11] Patent Number: 5,507,153
[45] Date of Patent: Apr. 16, 1996

[54] ELECTRIC MOTOR VEHICLE

[75] Inventors: Takeshi Seto; Hirokazu Sekino, both of Suwa, Japan

[73] Assignee: Seiko Epson Corporation, Tokyo, Japan

[21] Appl. No.: 338,467

[22] PCT Filed: Mar. 18, 1994

[86] PCT No.: PCT/JP94/00450

§ 371 Date: Nov. 17, 1994

§ 102(e) Date: Nov. 17, 1994

[87] PCT Pub. No.: WO94/21481

PCT Pub. Date: Sep. 29, 1994

[30] Foreign Application Priority Data

Mar. 22, 1993 [JP] Japan ................... 5-062019
Mar. 22, 1993 [JP] Japan ................... 5-062020
Apr. 5, 1993 [JP] Japan ................... 5-078302

[51] Int. Cl.$^6$ ............... B60H 1/00; B60L 7/22; B60L 11/18

[52] U.S. Cl. ............... 62/133; 62/230; 62/243; 62/134; 188/159; 320/61; 236/9 A

[58] Field of Search ............... 62/133, 134, 230, 62/241, 243, 244; 188/159; 320/61; 180/65.1, 65.3; 237/5, 8 R, 9 A, 12.3 R, 12.3 A, 12.3 B

[56] References Cited

U.S. PATENT DOCUMENTS

| | | | |
|---|---|---|---|
| 3,918,543 | 11/1975 | Halem | 62/323.4 X |
| 4,345,197 | 8/1982 | Wheadon et al. | 320/61 X |
| 4,425,765 | 1/1984 | Fukushima et al. | 62/133 |
| 4,510,764 | 4/1985 | Suzuki | 62/133 |
| 4,536,697 | 8/1985 | Johnston et al. | 320/61 X |
| 5,377,791 | 1/1995 | Kawashima et al. | 188/159 |

FOREIGN PATENT DOCUMENTS 61-65802   6/1986  Japan.
4-88301    7/1992  Japan.
4-355604  12/1992  Japan.

*Primary Examiner*—Harry B. Tanner
*Attorney, Agent, or Firm*—Kanesaka & Takeuchi

[57] ABSTRACT

The electric motor vehicle of this invention is an electric motor vehicle which is provided with a drive motor (13) driven by electric power from a storage battery (11), an air conditioner (1), and a regenerative brake means which temporarily uses the motor (13) as a generator when decelerating the vehicle to generate regenerative electric power and to charge the storage battery (11). It is further provided with an excess regenerative electric power judging means (18) for judging excess regenerative electrical energy based on regenerative electrical energy by the regenerative brake and allowable regenerative electrical energy of the storage battery at that time, and an electric power distribution means (14) for distributing the excess regenerative electric power based on the excess regenerative electrical energy. This excess regenerative electric power is used to enhance an air conditioning capacity to stop the operation of the air conditioner (1) and accumulated as heat in heat accumulating means (30, 34) to enhance an air conditioning efficiency, thereby attaining a highly efficient and power saving air conditioner (1).

13 Claims, 10 Drawing Sheets

ELECTRIC MOTOR VEHICLE

TECHNICAL FIELD

This invention relates to an electric motor vehicle which is provided with an electric air conditioner, and particularly to an electric motor vehicle which has an improved utilization efficiency of energy for the overall electric motor vehicle.

BACKGROUND ART

Recently, the electric motor vehicles are attracting attention because they will solve various problems due to the exhaust gas from internal combustion engines which are used for gasoline automobiles. More specifically, carbon dioxide which is contained in the exhaust gas form internal combustion engines accumulates and concentrates in the atmosphere, causing the greenhouse effect and air pollution which are serious problems against the global environment. As a next-generation vehicle which radically solves these problems, electric motor vehicles using a drive motor which does not produce exhaust gas are being put into practical use and various proposals are being made.

But, this drive source for the electric motor vehicles is a motor which has a high efficiency but produces less heat. Therefore, its heat cannot be used for an air conditioning system unlike enormous waste heat which is produced by the operation of conventional internal combustion engines. In view of this, a heat pump method is generally adopted for the air conditioner of the electric motor vehicle. When this air conditioner is operating, a low- or high-temperature refrigerant which is used to heat or cool the cabin is evaporated or condensed by conducting a heat exchange with the open air by means of an exterior heat exchanger and returned to a compressor, thus being circulated within the system in the same way as a room air conditioner.

In the electric motor vehicle, a regenerative brake which uses the drive motor as a generator is generally used in place of the engine brake of a conventional internal combustion engine. In this case, kinetic energy, which must be reduced when the electric motor vehicle decelerates or goes down a slope, is partly converted into electrical energy by temporarily using the drive motor as the generator, and this electrical energy is recovered into a storage battery, thus the drive motor provides a role of an auxiliary brake.

For this type of electric motor vehicle, a lead storage battery is generally used broadly in view of its cost and good resource balance. But, the lead storage battery has disadvantages that its performance is deteriorated and the service life is heavily ruined when the battery, which still has a remaining capacity higher than a prescribed level, is quickly recharged exceeding an appropriate charging current for the battery by high regenerative electric power.

For this reason, in the case of a conventional regenerative brake, the generated regenerative electric power is lowered to protect the lead storage battery, and a common foot brake is used to supplement an insufficient braking force of the electric motor vehicle. Other known methods include a method in that excess regenerative electric power which cannot be recovered into the storage battery is lead to a resistor located outside of the cabin to generate heat so as to release the generated heat into the open air, thereby consuming the excess regenerative electric power, and a method in that a flywheel is rotated by the motor which uses the regenerative electric power, thereby saving as mechanical energy in the flywheel.

A conventional electric motor vehicle, however, uses as an energy source a storage battery whose energy capacity is very small as compared with a fuel such as gasoline and, therefore, has disadvantages that a ratio of energy consumed by the air conditioner to the above capacity is high, and when the air conditioner is operated, a mileage per charge is shortened extremely.

Specifically, when the air conditioner of the electric motor vehicle operates to heat the cabin, since it uses a cabin heat exchanger having a smaller heat exchanging capacity than a room air conditioner, to sufficiently heat the cabin by introducing cold fresh air into the heat exchanger, it is necessary to set an operation condition so that a temperature of the refrigerant discharged from the compressor becomes a high enthalpy value and to increase the compressor speed to increase a flow rate of the refrigerant. As a result, the compressor has an increased compression load and an increased rotating speed, so that the air conditioner consumes electric power heavily.

To evaporate the refrigerant which is a gas-liquid mixture into a completely gaseous state and to return to the compressor by the heat exchanger having a small heat exchanging capacity, a very low evaporating pressure value is set so that an evaporating temperature of the refrigerant becomes ten-odd °C. lower than an outside-air temperature, e.g. $-10°$ to $-15°$ C., and a heating degree of 5° to 10° C. is given for complete evaporation. And, to raise a temperature for the heating degree, the flow of the refrigerant is reduced. As a result, the performance factor of a refrigerating cycle is lowered, and the overall efficiency of the air conditioner is lowered.

Furthermore, when this air conditioner is operated for cooling sufficiently by the cabin heat exchanger having a small heat exchanging capacity while introducing outside air of 30° C. or more, it is necessary to make a difference between the refrigerant evaporating temperature and the outside-air temperature large as much as possible. For example, to provide the evaporating temperature of $-10°$ to $-15°$ C., a very low evaporating pressure value is set. As a result, there are disadvantages that a volumetric efficiency is lowered as the compression ratio of the compressor increases, a flow rate of the refrigerant is decreased as a specific volume of the low-pressure refrigerant increases, and a refrigerating capacity at a prescribed compressor speed is lowered, thus the performance factor of the air conditioner is lowered significantly.

In addition, because the heat radiation of an internal combustion engine cannot be used, the electric motor vehicle needs to operate the air conditioner to heat. In a low-temperature environment such as in winter when heating is required, an electrochemical change in the storage battery is inactive, and a charging and discharging capacity of the storage battery is lowered greatly. And, in the low-temperature environment, a heating load in the cabin increases, with the trend increasing the power consumption by the air conditioner. Thus, there are disadvantages that the performance of the storage battery is lowered and the air conditioner consumes huge electric power, so that a mileage per charge is heavily shortened than in any other seasons.

And, when decelerating, since a regenerative braking force of the auxiliary brake is insufficient, a conventional method which requires to use the foot brake at the same time applies a large load to the foot brake and therefore has a problem in view of safety when the electric motor vehicle is running. Furthermore, the electric motor vehicle, which consumes excess regenerative electric power from the regenerative brake by radiation of heat by means of the resistor located outside the cabin, discards the recovered energy partly and has disadvantages that an energy utilization efficiency as the overall electric motor vehicle is low and a mileage per charge is short.

On the other hand, a conventional regenerative system using a flywheel or the like is expensive because a separate motor having a similar capacity to that used for running the electric motor vehicle is required and this device itself is heavy. These points are bottlenecks in putting them into practical use.

In view of the above, this invention is to provide an electric motor vehicle whose actual mileage can be extended by effectively using excess regenerative electric power to improve an energy utilization efficiency of the overall electric motor vehicle.

SUMMARY OF THE INVENTION

To accomplish the above object, a first invention relates to an electric motor vehicle which is provided with a drive motor to be driven by electric power from a storage battery, an air conditioner, and a regenerative brake means which temporarily uses the motor as a generator when decelerating the vehicle to generate regenerative electric power and to charge the storage battery, and is characterized by an excess regenerative electric power judging means for judging excess regenerative electrical energy based on regenerative electrical energy by the regenerative brake and allowable regenerative electrical energy of the storage battery when the regenerative brake is operating, and an electric power distribution means for distributing the excess regenerative electric power to the air conditioner based on the excess regenerative electrical energy.

A second invention relates to an electric motor vehicle which is provided with a drive motor to be driven by electric power from a storage battery, an air conditioner, and a regenerative brake means which temporarily uses the motor as a generator when decelerating the vehicle to generate regenerative electric power and to charge the storage battery, and is characterized by an excess regenerative electric power judging means for judging excess regenerative electrical energy based on regenerative electrical energy by the regenerative brake and allowable regenerative electrical energy of the storage battery when the regenerative brake is operating, and an electric power distribution means for distributing the excess regenerative electric power to a heat recovery circuit based on the excess regenerative electrical energy.

A schematic view showing the entire block diagram of an air conditioner for the electric motor vehicle according to a first embodiment of the invention.

FIG. 2

A control system chart of the air conditioner of the first embodiment.

FIG. 3

A flow chart showing a control operation of the air conditioner of the first embodiment.

FIG. 4

Energy balances of the electric motor vehicle of the first embodiment, (a) showing a travel speed graph of the electric motor vehicle, (b) showing a graph of electric power consumed/outputted by a drive motor, (c) showing a graph of electric power consumed by a compressor, and (d) showing a graph of outputted/charged electric power of a storage battery.

FIG. 5

Energy balances of a conventional electric motor vehicle, (a) showing a travel speed graph of the electric motor vehicle, (b) showing a graph of electric power consumed/outputted by a drive motor, (c) showing a graph of energy consumption by a foot brake, (d) showing a graph of electric power consumed by a compressor, and (e) showing a graph of outputted/charged electric power of a storage battery.

FIG. 6

A control system showing a second embodiment of the invention.

FIG. 7

A schematic view showing the entire block diagram of an air conditioner for the electric motor vehicle according to a third embodiment of the invention.

FIG. 8

A schematic view showing the entire block diagram of an air conditioner for the electric motor vehicle according to a fourth embodiment of the invention.

FIG. 9

A schematic view showing the entire block diagram of an air conditioner for the electric motor vehicle according to a fifth embodiment of the invention.

FIG. 10

Energy balances of the electric motor vehicle of the first embodiment, (a) showing a travel speed graph of the electric motor vehicle, (b) showing a graph of electric power consumed/outputted by a drive motor, (c) showing a graph of recovered energy by a resistor, (d) showing a graph of electric power consumed by a compressor, and (e) showing a graph of outputted/charged electric power of a storage battery.

BEST MODE FOR CARRYING OUT THE INVENTION

Figure 1:
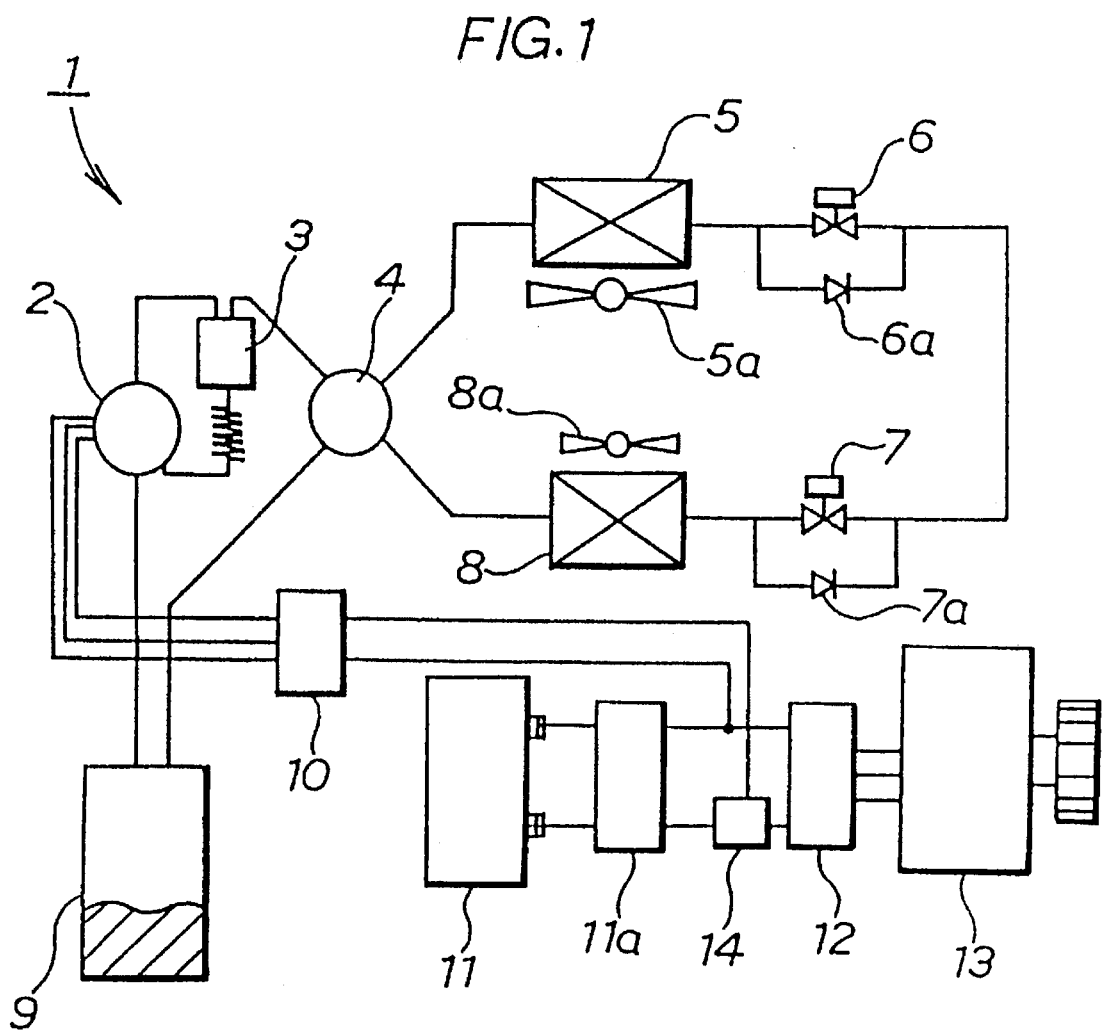
FIG. 1
Figure 2:
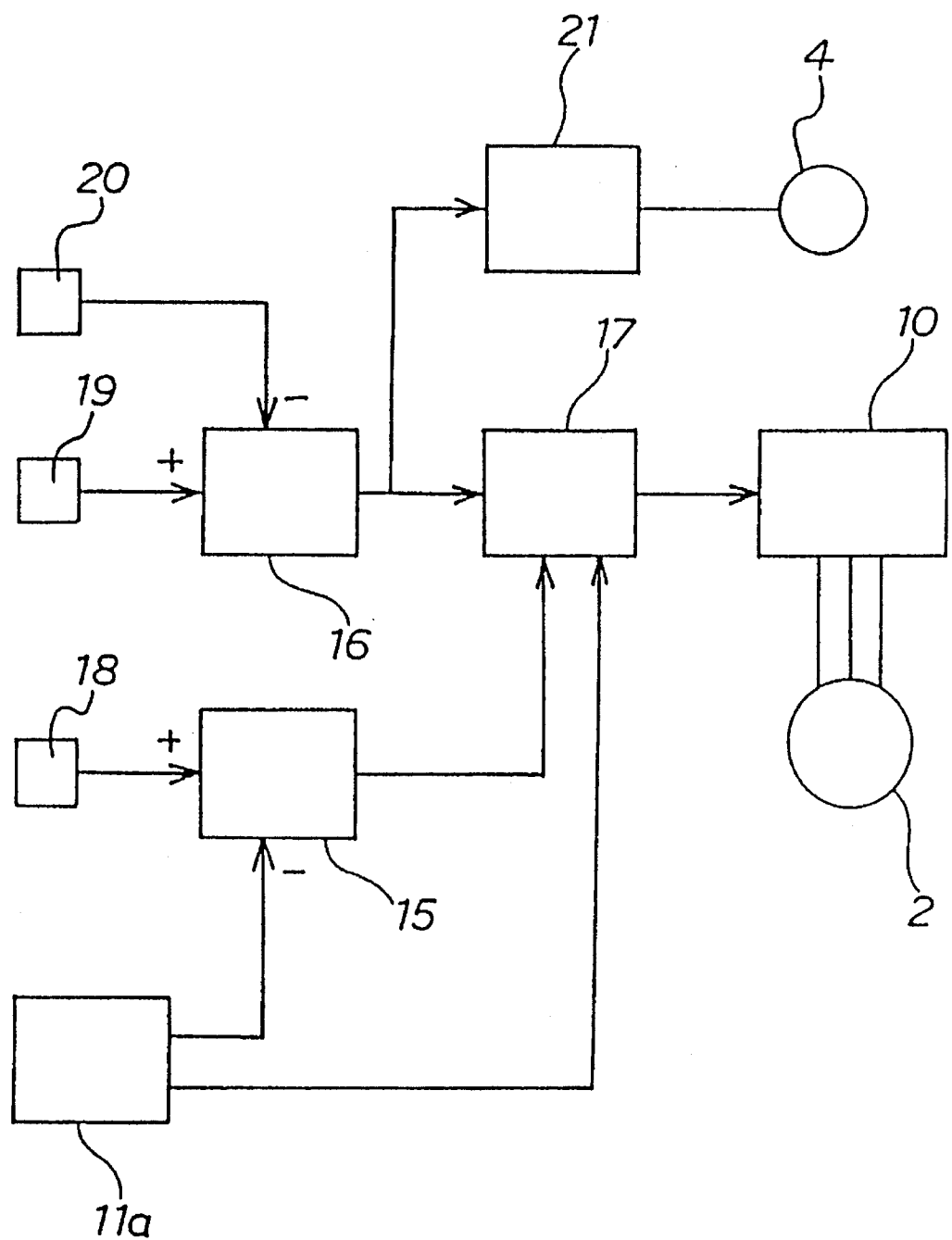

First embodiment of the invention will be described with reference to FIG. 1 through FIG. 5. FIG. 1 shows the entire block diagram of an air conditioner for the electric motor vehicle of this embodiment using a heat pump as a working principle of the air conditioner. FIG. 2 shows a control system chart of the air conditioner of this embodiment. The motive power of the air conditioner of this embodiment is the same as that of a compressor for the heat pump.

More specifically, as shown in FIG. 1, an air conditioner 1 of this embodiment consists in the following order of a compressor 2 connected by piping, an oil separator 3, a four-way valve 4, an exterior heat exchanger 5, two pairs of expansion valves 6, 7, an interior heat exchanger 8, and an accumulator 9. When the air conditioner 1 is operating, a refrigerant which is sent out by the compressor 2 is designed to circulate in forward or reverse direction within the above equipment by switching the four-way valve 4 according to cooling or heating operation of the air conditioner 1.

The compressor 2 has a built-in motor for driving it, and this built-in motor has its operation such as a rotating speed controlled according to driving electric power by a compressor drive circuit 10. The drive circuit 10 for the compressor 2 is supplied with discharge electric power from a storage battery 11 when the electric motor vehicle is running normally.

The storage battery 11 is connected to a drive motor 13 for running the electric motor vehicle through a drive circuit 12 for the drive motor, and supplies discharge electric power according to the vehicle speed. Further, an electric power distribution device 14 is disposed between the storage battery 11 and the drive circuit 13. And, a regenerative brake is configured to recover energy as regenerative electric power by using temporarily the drive motor 13 as a generator when the vehicle is decelerating and converting kinetic energy corresponding to a speed to be decelerated into electrical energy. Reference numeral 11a is a storage battery remaining capacity meter which is connected to the output terminal of the storage battery 11.

When the air conditioner 1 is operating in a heating mode, a heat exchange cycle of the air conditioner as a heat pump includes that a steam refrigerant in a high-temperature and high-pressure state which is compressed by the compressor 2 and has an oil separated by the oil separator 3 is sent to the interior heat exchanger 8 by the four-way valve 4, in which heat exchange is conducted with the air in the cabin at a condensed heating value of the condensed refrigerant to heat the cabin, and the condensed refrigerant is cooled to become a liquid refrigerant.

As shown in FIG. 2, the electric power distribution device 14 consists of a power consumption indicator 15 and an air conditioner power adjusting device 17 which is connected to the power consumption indicator 15 and to a temperature adjusting device 16. The air conditioner power adjusting device 17 is connected to the drive circuit 10 for the compressor 2 to control the operation of the compressor 2. The power consumption indicator 15 is connected to a regenerative electric power detector 18 and to the storage battery remaining capacity meter 11a. And, the temperature adjusting device 16 is connected to a temperature adjuster 19 which is provided within the cabin and manually controlled by a passenger to a comfortable temperature and to a temperature detector 20 which is provided within the cabin to detect a temperature within the cabin.

When the air conditioner 1 is operating with the vehicle running normally, a target temperature set by the temperature adjuster 19 and the cabin temperature detected by the temperature detector 20 are inputted into the temperature adjusting device 16. Then, a difference between the above temperatures is calculated by the temperature adjusting device 16, and a signal for the difference is outputted to the air conditioner power adjusting device 17. According to this difference signal, the operation of the compressor 2 is controlled by the air conditioner power adjusting device 17.

The output signal from the temperature adjusting device 16 is inputted into a four-way valve controller 21, and according to a value of this signal, the connection of the four-way valve 4 is switched. Thus, a direction in which the refrigerant flows is switched to select a heat transmission direction into or outside of the cabin as the heat pump, thereby heating or cooling the cabin. The four-way valve controller 21 has hysteresis against the entry of the signal to prevent unnecessary switching.

The storage battery remaining capacity meter 11a is connected to the output terminal of the storage battery 11 to measure an I/O current/voltage of the storage battery 11 and to indicate to the driver a remaining capacity of the storage battery 11 at that instant. At the same time, an allowable regenerative electric power value corresponding to the remaining capacity is outputted to the power consumption indicator 15.

Regarding the electric motor vehicle having the above structure, action which takes place when the regenerative brake is operated will be described. First, when the electric motor vehicle comes to an intersection or a down hill and operates the drive motor 13 as a generator to decelerate, a certain quantity of regenerative electric power is generated. This regenerative electrical energy is detected by the regenerative electric power detector 18, and a regenerative electric power signal is sent to the power consumption indicator 15. And, the power consumption indicator 15 calculates a difference between the regenerative electrical energy and the allowable regenerative electric power value of the storage battery 11. When this difference is negative, or a regenerative electric power value is lower than the allowable regenerative electric power value, the power consumption indicator 15 does not output, and regenerative electric power is recovered by the storage battery 11.

On the other hand, when the regenerative electric power value is higher and excess regenerative electric power which cannot be absorbed by the storage battery 11 is generated, a power consumption indicating value corresponding to the excess power is outputted to the air conditioner power adjusting device 17. And, the air conditioner power adjusting device 17 switches a compressor power indicating value, which is indicated by the temperature adjusting device 16 when the vehicle is running normally, into a power consumption indicating value indicated by the power consumption indicator 15, and outputs a compressor power indicating signal to the drive circuit 10 for the compressor.

Therefore, since the power consumption indicating value when the regenerative brake is operating is higher than the compressor power indicating value under normal conditions, the compressor 2 operates at a higher level than the capacity required to control the ordinary air conditioning environment. For example, in a heating mode, a temperature of the exterior heat exchanger 5 is lowered, and a temperature of the interior heat exchanger 8 is increased. Consequently, control is made to increase the rotating speed of an exterior air blower 5a and to decrease the rotating speed of an interior air blower 8a, thereby keeping the cabin temperature at a prescribed level. Thus, the air conditioning capacity enhanced by the excess regenerative electric power is stocked as heat in the exterior and interior heat exchangers 5, 8 of the air conditioner 1. When the power consumption indicating value is smaller than the compressor power indicating value, the storage of the regenerative electric power as heat by the enhanced capacity of the air conditioner is not conducted, but since all excess regenerative electric power is effectively used for the air conditioner, an energy balance efficiency can be improved.

When the regenerative state returns to the ordinary running state, since the heating capacity is improved by the storage of heat due to the excess regenerative electric power as described above, an effect of improving the heating capacity appears falling in a trend of increasing the cabin temperature, then the operation of the compressor 2 can temporarily come to a halt or is reduced because the rotating speed of the compressor 2 is controlled depending on the cabin temperature. Thus, excess heating is prevented and comfortability is maintained, temporarily needless driving electric power of the compressor 2 reduces the power consumption by the air conditioner 1, and discharge output of the storage battery 11 after regeneration can be lowered. Therefore, a mileage per charge can be extended, high discharge current of the storage battery can be avoided, and the storage battery life can be extended.

When the cabin temperature excessively rises regardless of the above control when running a long down hill, the four-way valve 4 is switched into a cooling mode to keep the cabin at a suitable temperature.

When the remaining capacity of the storage battery 11 lowers to below a prescribed value when the vehicle is running normally, a compressor power limiting signal is directly outputted from the storage battery remaining capacity meter 11a to the air conditioner power adjusting device 17 to restrict the upper limit of the power consumed by the compressor 2, so that the storage battery energy is consumed for running with priority, making it possible to extend a mileage per charge.

Figure 3:
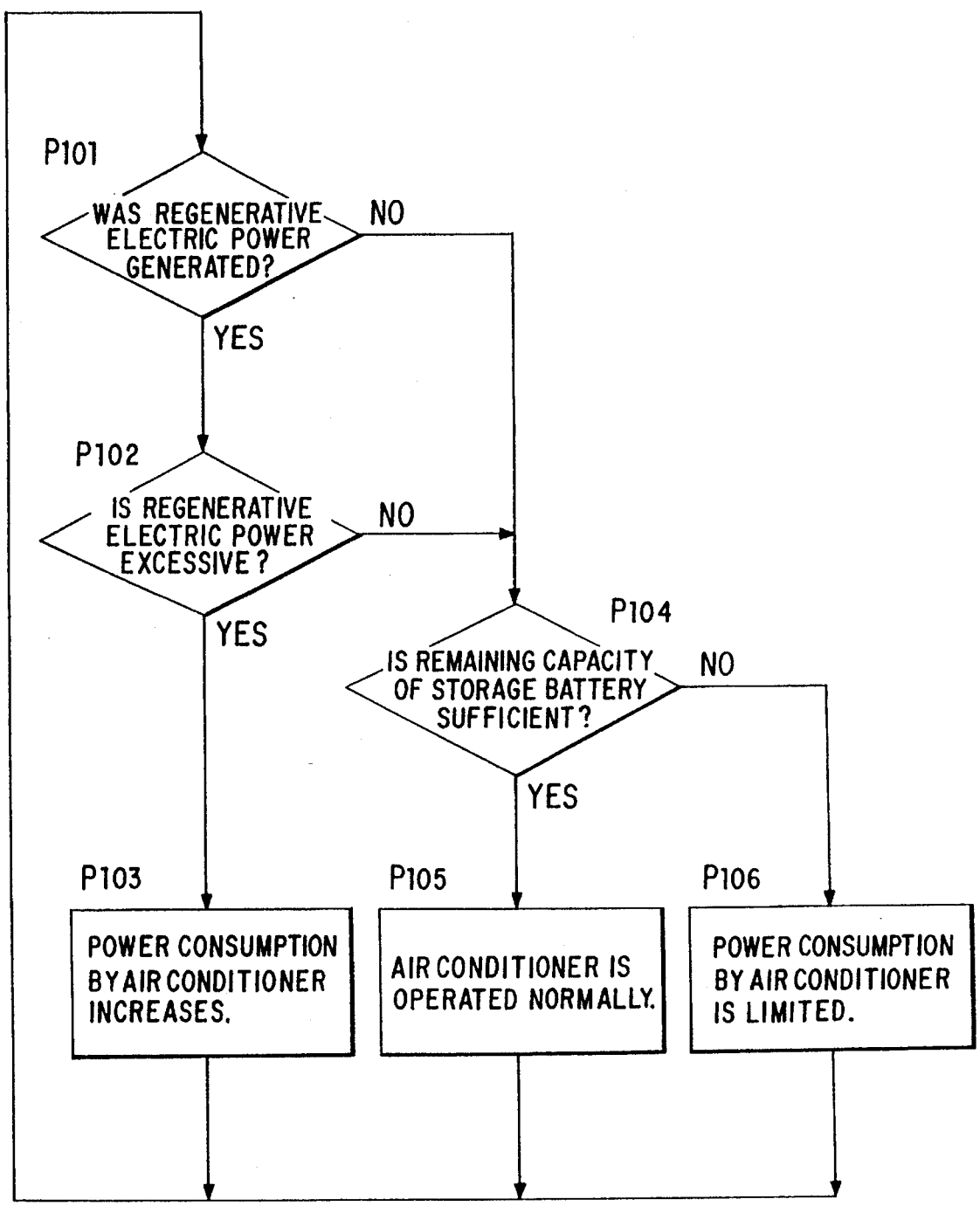
Figure 4A:
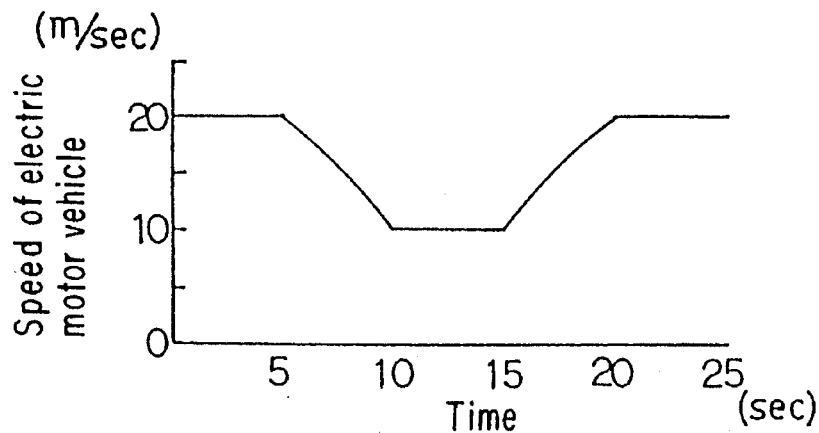
Figure 4B:
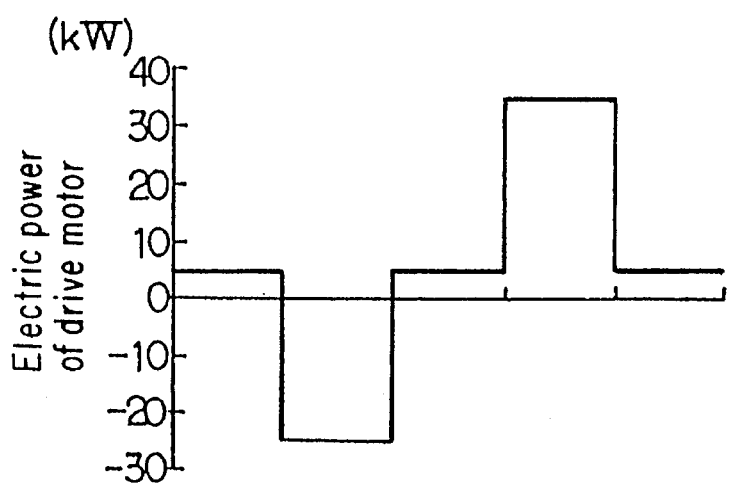
Figure 4C:
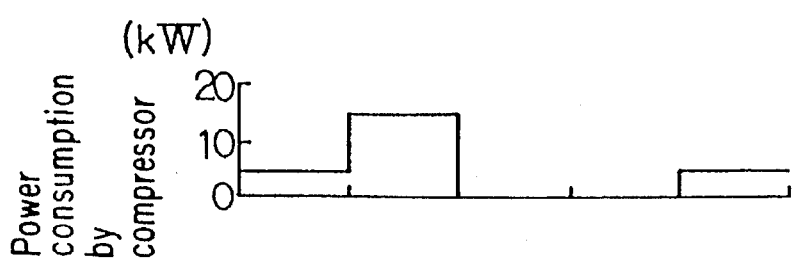
Figure 4D:
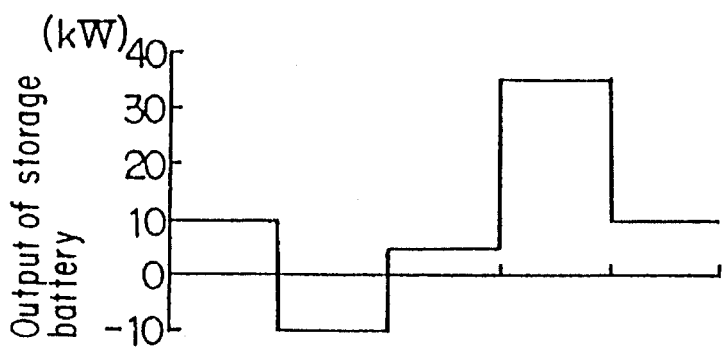
Figure 5A:
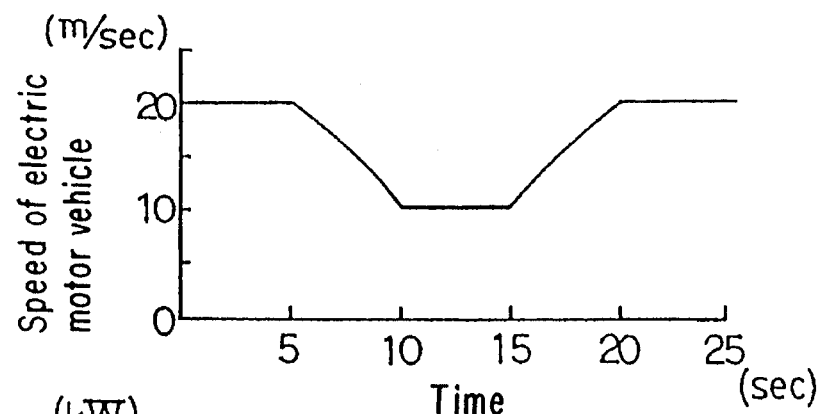
Figure 5B:
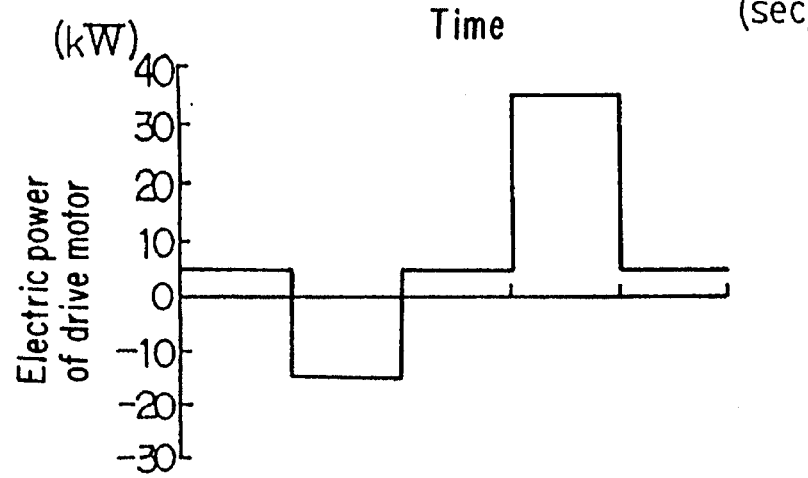
Figure 5C:
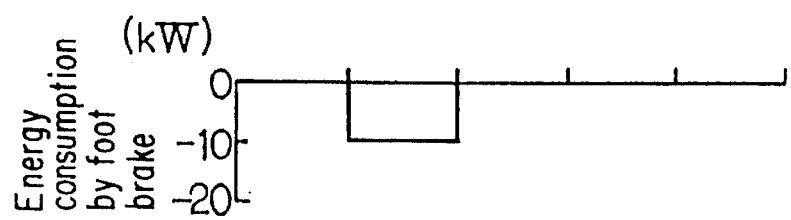
Figure 5D:
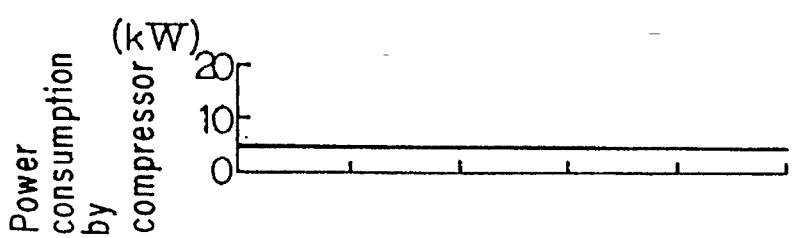
Figure 5E:
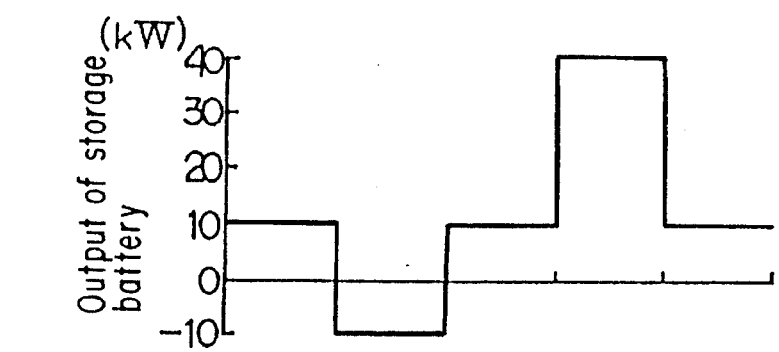

The overall control of the air conditioner 1 will be described with reference to the flowchart of FIG. 3. When the electric motor vehicle of this embodiment is running and the air conditioner is operating, in a step P101, the regenerative brake operates due to the deceleration or the like of the electric motor vehicle, and it is judged whether regenerative electric power is produced. Where the regenerative electric power is produced, the next step is a step P102 in which it is judged whether the regenerative electric power is higher than the allowable regenerative electric power of the storage battery and, if the regenerative electric power is not produced, followed by steps P104 to P106.

In the step P102, the regenerative electric power generated by the drive motor as the regenerative brake is compared with the allowable regenerative electric power of the storage battery when the regenerative brake is operated and, when the regenerative electric power is higher than the allowable regenerative electric power of the storage battery, the next step is a step P103, but when the regenerative electric power is higher than the allowable regenerative electric power, followed by steps P104 to P106.

In the step P103, excess regenerative electric power which cannot be absorbed by the storage battery is absorbed by increasing the power consumption by the air conditioner. Specifically, the excess regenerative electric power is absorbed as the driving electric power for the compressor of the air conditioner, and the compressor is excessively driven to increase the refrigerant flow rate to reinforce the capacity of the air conditioner as the heat pump. And, according to the reinforced air conditioning capacity, excess heating is prevented by temporarily suppressing or stopping the operation of the air conditioner after the compression of regeneration, and the power consumption by the air conditioner is saved by limiting the operation. And, after the completion of the process in the step P103, the process returns to the step P101, and a series of control is continued.

In the step P104 that the regenerative brake is not operating or the regenerative electric power is lower than the allowable regenerative electric power, it is judged whether the remaining capacity of the storage battery is sufficient. Specifically, when the storage battery has a sufficient capacity at that point, the step P105 is the next and, when the capacity is rather insufficient, the step P106 is the next. This capacity judging standard is previously determined according to the characteristics of each storage battery. For example, it is set as a ratio of the remaining capacity usable at that point.

And, in the step P105, control is made ordinarily because the capacity is sufficient. Specifically, the air conditioner is automatically controlled according to interior and exterior air conditioning environments, and the storage battery power according to this control is consumed without limitation. After the completion of the process in the step P105, the process returns to the step P101.

When the capacity is rather insufficient, the air conditioner falls in a power-saving mode in the step P106 to save the power consumption by the air conditioner. In other words, a prescribed upper limit is given to the power consumption by the air conditioner, so that the storage battery power is not consumed exceeding the limit. Therefore, the remaining power of the storage battery is assigned with priority to the drive motor of the vehicle, and its mileage can be extended. After the completion of the step P106, the process returns to the step P101.

Now, the energy balance of the electric motor vehicle of this embodiment will be described. FIG. 4 shows the energy balance of the electric motor vehicle of this embodiment, and FIG. 5 shows the energy balance of a conventional electric motor vehicle. The electric motor vehicles of this embodiment and the prior art have the same weight of 1000 kg, and a loss due to a running resistance when the vehicle is running is simplified to be a constant 5 kW regardless of the speed. And, the vehicles are accelerated or decelerated at an equal energy momentum of 30 kW. Furthermore, the allowable regenerative electric power of the storage battery at this moment is 10 kW, and this allowance corresponds to 100 A of a storage battery of for example 100 V and 200 Ah, falling in a state that the battery has discharged substantially. And, immediately after the complete charging, the allowable regenerative electric power is further decreased.

First, the energy balance of the conventional electric motor vehicle will be described with reference to FIG. 5. In FIG. 5, (a) shows a travel speed of the electric motor vehicle, (b) shows electric power consumed/outputted by a drive motor, (c) shows energy consumption by a foot brake, (d) shows electric power consumed by a compressor, and (e) shows outputted/charged electric power of a storage battery. In these figures, the horizontal axis shows time common to these figures. When the electric motor vehicle runs at the speed shown in FIG. 5 (a), the consumed/outputted power by the drive motor includes 5 kW at a constant-speed running, −15 kW when decelerating, and 35 kW when accelerating.

Now, the energy balance of the electric motor vehicle when decelerating will be described in detail. First, a total of the allowable regenerative electric power 10 kW of the storage battery and the compressor power consumption 5 kW is energy which is recovered and absorbed as electrical energy by the electric motor vehicle. And, when this vehicle decelerates, kinetic energy of 30 kW is released when converted into electrical energy, but energy requiring actual absorption is 25 kW because 5 kW is lost by the running vehicle. Subtraction of 15 kW, which is electric power absorbable as the aforementioned electrical energy, from 25 kW is 10 KW which is energy consumed when decelerating for five seconds by the foot brake. In other words, of the recoverable kinetic energy of 26 kW when decelerating, 15 kW is converted into electrical energy and recovered, and the remaining 10 kW is consumed by the foot brake and not recovered.

In view of the above, as shown in FIG. 5 (e), the storage battery outputs 10 kW which is a sum of the compressor consumption electric power and the running loss when the vehicle is running at a constant speed, charges 10 kW as described above when decelerating, and outputs 40 kW which is the sum total of the compressor consumption electric power, the running loss, and energy required for accelerating when the vehicle is accelerating.

The electric motor vehicle of this embodiment will be described with reference to FIG. 4. In FIG. 4, (a) shows a travel speed of the electric motor vehicle, (b) shows electric power consumed/outputted by a drive motor, (c) shows electric power consumed by a compressor, and (d) shows discharged/charged electric power of a storage battery. In these figures, the horizontal axis shows time common to these figures. First, as shown in FIG. 4 (a), when the electric motor vehicle runs at the same speed as in the prior art of FIG. 5, electric power of the drive motor shown in FIG. 4 (b) includes 5 kW at a constant-speed running, −15 kW when decelerating, and 35 kW when accelerating. As compared with the prior art, electric power of the drive motor when the vehicle is decelerating is high and the foot brake is not required to supplement braking, because after recovering decelerating energy as electrical energy, it can be converted into heat energy and stocked in the heat exchanger or the like. In other words, all kinetic energy when the vehicle is decelerating can be converted into electrical energy and absorbed. And, a charged quantity to the storage battery when regenerating is electrical energy which does not apply a load to the storage battery in the same way as in the prior art. As a result, the regenerative brake becomes powerful and the air conditioning capacity is reinforced, so that the compressor of the air conditioner can be stopped for a while after decelerating. Therefore, output of the storage battery is lowered corresponding to the electric power consumed by the compressor, and the integral of the power consumption can be made small for a given time. And, the storage battery suffers from adverse effects of shortening the service life and a discharge efficiency due to high current discharge. But, in this embodiment, acceleration of the vehicle immediately after deceleration which is often done in ordinary running conditions does not need temporarily the power consumption by the compressor, so that there are remarkable effects that high current discharge of the storage battery can be avoided, and a load applied to the storage battery is reduced.

The above embodiment has been described mainly in connection with the heating mode of the air conditioner, but in the air conditioner using a heat pump so that the interior and exterior heat exchangers have their roles alternately switched into a condenser and an evaporator by switching the four-way valve, energy consumed by the air conditioner can be saved using regenerative electric power in the same way when cooling, too.

As described above, according to this embodiment, the electric motor vehicle, which is provided with the air conditioner and the drive motor which is driven by electric power supplied by the storage battery, is also provided with the power consumption indicator in which signals of the storage battery state and the regenerative state by a storage battery terminal voltmeter and the storage battery remaining capacity meter are inputted, and the air conditioner power adjusting device which increases the power of the air conditioner according to the instructions from the power consumption indicator, so that the power consumption by the air conditioner can be increased according to the storage battery state and the regeneration state. Thus, excess regenerative electric power which cannot be absorbed by the storage battery under regeneration can be used by the air conditioner. More specifically, since this excess regenerative electric power can be stocked as heat, electric power of the storage battery used by the air conditioner is saved to improve an energy efficiency, to extend a mileage per charge of the electric motor vehicle, and can reinforce the regenerative brake.

And, when the detected remaining capacity of the storage battery is small, the power consumption by the air conditioner when the vehicle is running normally is restricted to secure electric power for running with precedence over air conditioning, so that the electric motor vehicle whose mileage per charge can be extended can be realized.

Furthermore, by virtue of the fact that this embodiment can use the storage battery state detecting means and the regenerative electric power detecting means which are generally provided for the conventional electric motor vehicle, the addition of a simple control circuit to them can extend an actual mileage per charge inexpensively, and an electric motor vehicle whose regenerative brake contributing to safety has been reinforced can be produced.

Figure 6:
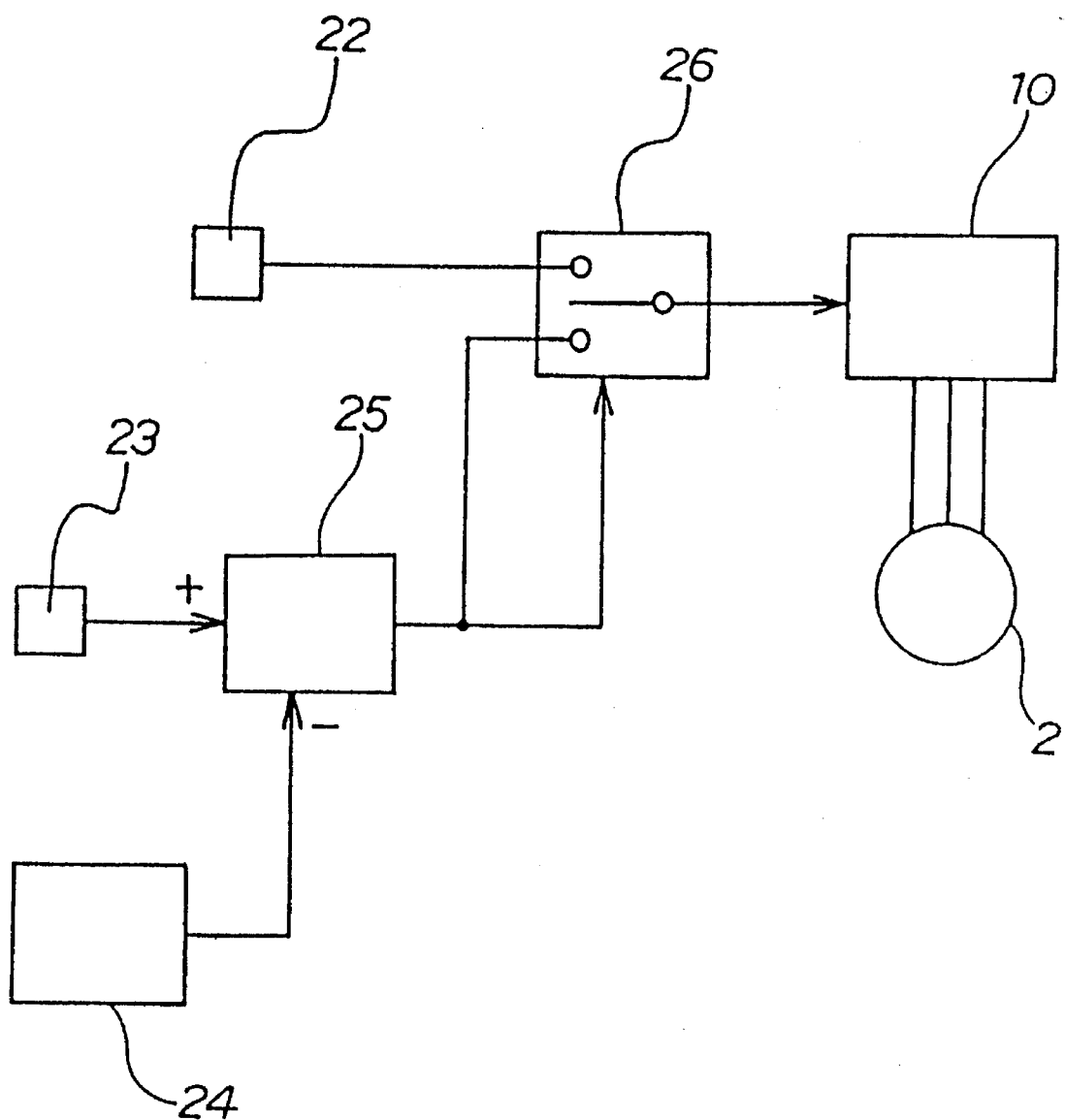

A second embodiment of the invention will be described with reference to the drawings. In this embodiment, the air conditioner 1 has the same structure as in the first embodiment. FIG. 6 is a control system diagram of this invention. As shown in FIG. 6, this embodiment is used for the air conditioner 1 in that electric power consumed by the compressor 2 is directly adjusted by a compressor power adjuster 22.

Specifically, reference numeral 23 represents a terminal voltmeter and 24 represents a storage battery reference voltage generator which generates the maximum allowable voltage of the storage battery 11. They respectively output a voltage signal and a refefence voltage signal to a voltage comparator 25. According to these signals, a voltage difference is determined by the voltage comparator 25. And, when the storage battery voltage is higher or the regenerative electric power is excessively large, a consumed electric trio power indicating value corresponding to the difference is sent to a compressor power indicating signal switching device 26.

Generally, the compressor power indicating signal switching device 26 switches a signal, which has entered the drive circuit 10 for the compressor 2 from the compressor power adjuster 22, into the consumed electric power signal from the voltage comparator. Thus, the same operation as in the first embodiment can be made to obtain the same effect.

Figure 7:
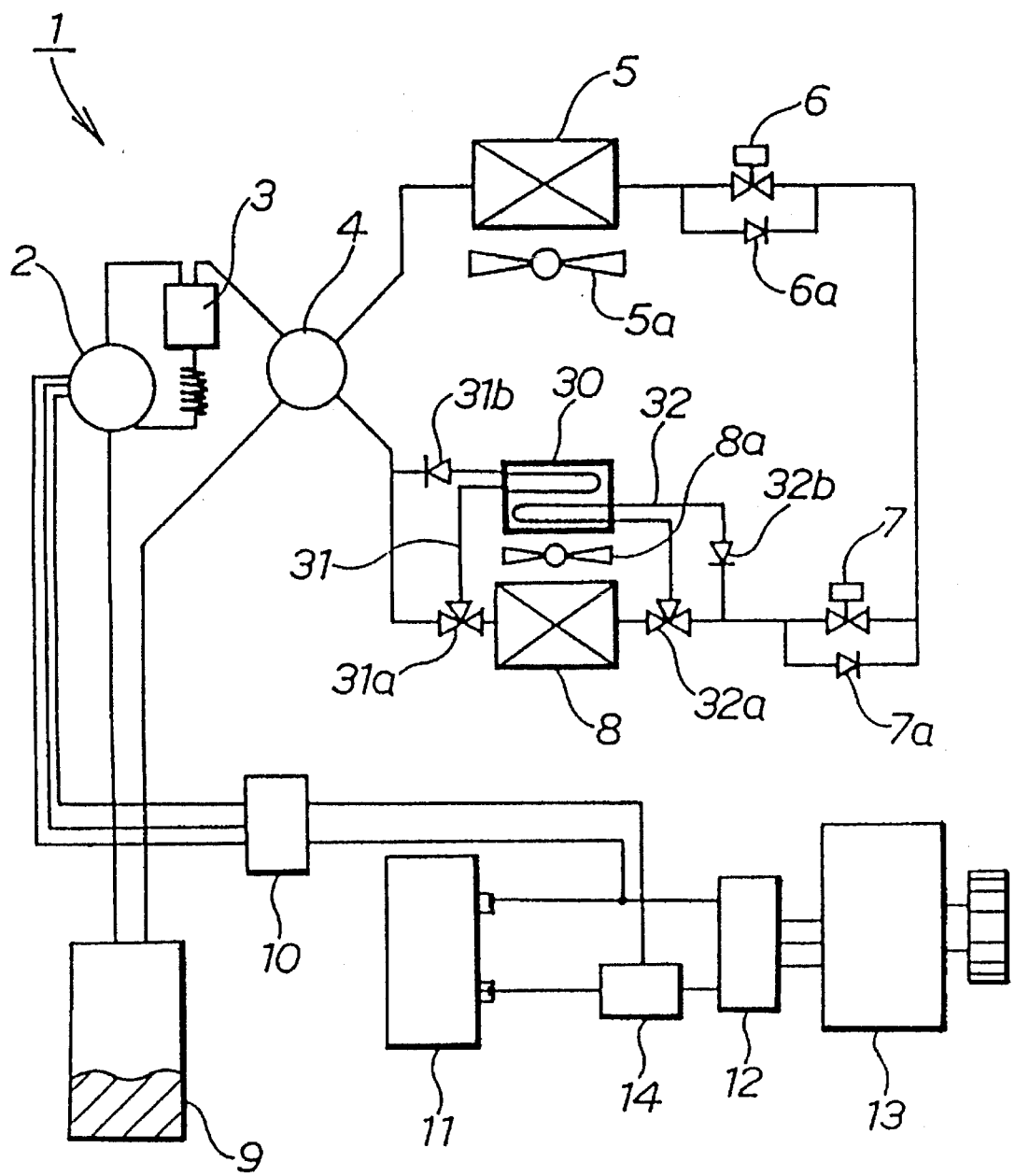

Furthermore, a third embodiment of the invention will be described with reference to FIG. 7. FIG. 7 shows the entire structure of an air conditioner for the electric motor vehicle according to this embodiment. Since the basic equipment configuration is the same as in the first embodiment, the same reference numerals are given to the same equipment. The air conditioner 1 of this embodiment has its principal pipe consisted in the following order of the compressor 2 connected by piping, the oil separator 3, the four-way valve 4, the exterior heat exchanger 5, two pairs of expansion valves 6, 7, the interior heat exchanger 8, and the accumulator 9. And, through these equipment, the refrigerant is designed to circulate in forward or reverse direction according to the cooling or heating mode of the air conditioner 1.

A cabin heat accumulating means 30 is disposed on the air intake side of the interior heat exchanger 8, and dual circuit bypass pipes 31, 32 which lead the refrigerant into the cabin heat accumulating means 30 are connected via three-way valves 31a, 32a and check valves 31b, 32b which are respectively disposed on intake and outlet pipes of the interior heat exchanger 8.

Furthermore, the compressor 2 is driven to compress by a built-in motor, and this motor has electric power supplied by the storage battery 11.

The drive circuit 10 for driving the compressor 2 is connected to the electric power distribution device 14, and can be connected to the storage battery 11 or the drive circuit 12 for the drive motor 13 by the electric power distribution device 14. And, the electric power distribution device 14 is provided with the regenerative electric power detector 18. When the air conditioner 1 is operating, if the regenerative brake is operated, the regenerative electric power detector 18 of the electric power distribution device 14 detects regenerative electric power. Then, the electric power distribution device 14 appropriately cuts off the storage battery 11 and the drive circuit 12 of the drive motor 13 according to a rechargeable condition of the storage battery 11, and appropriately connects the drive circuit 10 of the compressor 10 on the other hand, then controls a rotational frequency of the compressor 2, thereby recovering the regenerative electric power to the storage battery 11 and the compressor 2.

The heat exchanging cycle when the air conditioner 1 operates to heat will be described. First, the refrigerant which is circulating within the air conditioner 1 is compressed by the compressor 2 and has an oil separated by the oil separator 3. Then, the compressed refrigerant under high-temperature and high-pressure conditions is sent to the interior heat exchanger 8 by the four-way valve 4.

And, when the vehicle is running normally, the interior heat exchanger 8 is used to conduct the heat exchange of the air in the cabin to heat the cabin only by the condensed heating value of the compressed refrigerant. As a result, the compressed refrigerant is cooled into a liquid refrigerant.

On the other hand, when the vehicle is decelerating, the regenerative brake operates and generates regenerative electric power, and the regenerative electric power is detected by the electric power distribution device 14. When this regenerative electric power exceeds the allowable charging quantity of the storage battery at that time, the electric power distribution device 14 controls the operation of the drive circuit 10 for the compressor 2 according to the excess electrical energy, and the drive circuit 10 increases the rotational frequency of the compressor 2. This control increases the flow rate of the refrigerant which is circulated during the heat exchange cycle, so that the heating capacity of the air conditioner 1 is enhanced.

And, to prevent excessive heating by the enhanced heating capacity, the air quantity by the air blower is kept constant or reduced. Therefore, an increased portion of the flow rate of the refrigerant is not cooled and discharged in a gaseous state from the interior heat exchanger 8.

Thus, when the excess regenerative electric power which cannot be recovered by the storage battery at that time is greater than the electric power consumed by the compressor at that time, the passage of the refrigerant is switched by the three-way valve 32a to the passage to the cabin heat accumulating means 30. And, the refrigerant is lead to the cabin heat accumulating means 30 through the bypass pipe 32, and the condensed heat of the remaining gas refrigerant is accumulated in the cabin heat accumulating means 30.

And, the refrigerant which is thoroughly cooled by the cabin heat accumulating means 30 passes through the three-way valve 32a in the forward direction to return to the principal pipe, and goes around the expansion valve 7 by the check valve 7a. Furthermore, the refrigerant is forced to pass through the expansion valve 6 by the check valve 6a, appropriately decreased in pressure by the expansion valve 6, and sent to the exterior heat exchanger 5. In the exterior heat exchanger 5, the refrigerant is fully heat-exchanged with the open air by an appropriate speed control of the air blower 5a and evaporated.

Lastly, the refrigerant passes through the four-way valve 4 and the accumulator 9 to be taken into the compressor 2, thereby starting another circulating cycle.

Repeating the above heat exchange cycle allows the cabin heat accumulating means 30 to gradually hold a large quantity of heat, and higher temperature air than when the vehicle is running normally is sent into the interior heat exchanger 8 by the air blower 8a. As a result, a temperature difference from the condensed temperature of the compressed refrigerant is reduced and a heating load of air is lowered, thereby improving substantial heating capacity. The improved portion of the heating capacity appears as an increase of the blowing air temperature from the interior heat exchanger 8, so that heating of the cabin becomes sufficient or rather excessive.

In this case, the rotational frequency of the compressor 2 in the air conditioner 1 is generally controlled according to the cabin temperature. When the effect of improving the heating capacity appears, the operation frequency of the compressor 2 is lowered or stopped temporarily to avoid excessive heating, and the power consumption by the air conditioner 1 can be reduced. Besides, by virtue of the fact that the discharge output of the storage battery 11 can be reduced temporarily after deceleration, a mileage per charge can be extended, and the service life of the storage battery 11 can be improved.

Now, the heat exchange cycle when the air conditioner 1 operates for cooling will be described. First, in the same way as in the heating operation, the refrigerant is compressed by the compressor 2, and has an oil separated by the oil separator 3. Then, the compressed refrigerant under high-temperature and high-pressure conditions is sent to the exterior heat exchanger 5 by the four-way valve 4. And, the refrigerant is cooled by the air blower 5a in the exterior heat exchanger 5 into a liquid refrigerant. Then, the liquid refrigerant goes around the expansion valve 6 by the check valve 6a, and passes through the expansion valve 7 by the check valve 7a to be reduced in pressure appropriately. And, this decompressed refrigerant passes through the three-way valve 32a into the interior heat exchanger 8 without being lead into the cabin heat accumulating means 30 by the check valve 32b, is heat-exchanged with the air in the cabin and evaporated, passes through the four-way valve 4 and the accumulator 9, and is taken into the compressor 2.

In this case, the air conditioner 1 when the vehicle is running normally, conducts the heat exchange with the air in the cabin only by the latent heat of vaporization of the gas-liquid refrigerant in the interior heat exchanger 8 to cool the cabin.

On the other hand, in the air conditioner 1 when the vehicle is decelerating, the regenerative brake is operated by the deceleration of the vehicle, and the electric power distribution device 14 detects regenerative electric power. Then, in the same way as in the heating operation, the rotational frequency of the compressor 2 is increased, and the flow rate of the refrigerant circulated during the heat exchange cycle is increased, thereby enhancing the cooling capacity. To prevent excessive cooling, the air quantity by the air blower is kept constant or reduced, and an increased portion of the flow rate of the refrigerant is not evaporated and discharged in a gas-liquid state from the interior heat exchanger 8. Therefore, the passage of the refrigerant is switched by the three-way valve 31a to lead the refrigerant into the cabin heat accumulating means 30 through the bypass pipe 31, and the latent heat of vaporization of the remaining gas-liquid refrigerant is accumulated in the cabin heat accumulating means 30. The refrigerant which is thoroughly evaporated by the cabin heat accumulating means 30 is returned to the principal pipe through the check valve 31b, passed through the four-way valve 4 and the accumulator 9, and taken into the compressor 2.

Repeating the above heat exchange cycle allows the cabin heat accumulating means 30 to gradually hold a large quantity of cool, and lower temperature air than when the vehicle is running normally is sent into the interior heat exchanger 8 by the air blower 8a. As a result, a temperature difference from the evaporating temperature of the compressed refrigerant is reduced and a cooling load of air is lowered, thereby improving substantial cooling capacity. The improved portion of the cooling capacity appears as a decrease of the blowing air temperature from the interior heat exchanger 8, so that cooling of the cabin becomes sufficient or rather excessive.

Therefore, in the same way as in the above heating operation, when an effect of improving the cooling capacity appears, the operation frequency of the compressor 2 is lowered or stopped temporarily to avoid excessive cooling, and at the same time the power consumption by the air conditioner can be reduced. Besides, by virtue of the fact that the output value of the storage battery 11 after regeneration can be reduced, a mileage per charge can be extended, and the service life of the storage battery 11 can be elongated.

And, the same effect as described above can be obtained by structuring the bypass pipe 31 and the bypass pipe 32 so that the refrigerant on the intake side of the interior heat exchanger 8 can be introduced, or by combining the bypass pipe 31 and the bypass pipe 32 into one bypass pipe, and by directly introducing the compressed refrigerant or gas-liquid refrigerant into the cabin heat accumulating means 30 according to the control of supplying the refrigerant by the detection of regenerative electric power in the same way as described above, the same effect as described above can be obtained.

As described above, this embodiment relates to an electric motor vehicle which is provided with the air conditioner and the drive motor which are driven by the electric power supplied by the storage battery, and the electric power distribution device for distributing the electric power to them; the heat accumulating means for introducing the refrigerant at either the outlet or inlet side of the interior heat exchanger is disposed on the interior heat exchanger of the air conditioner; or the heat accumulating means for introducing the refrigerant at either the outlet or inlet side of the interior heat exchanger of the exterior heat exchanger is disposed; and a refrigerant passage control valve for controlling the supply of the refrigerant to the respective heat accumulating means according to the detection of the regenerative electric power of the electric power distribution device is provided. Therefore, when the regenerative brake is operated due to deceleration when the air conditioner is operating, the electric power distribution device outs off the storage battery and the motor completely or appropriately to utilize all or part of the regenerative electric power from the regenerative brake as driving electric power of the compressor 2 in the air conditioner. Thus, the cooling and heating capacity can be enhanced. And, the quantity of heat corresponding to the excess portion of cooling or heating is accumulated in the heat accumulating means and used to adjust or improve the cooling or heating capacity in the cabin, or used as the heat of evaporation of the refrigerant in the heat exchange cycle in winter, thereby making it possible to effectively use without waste the regenerative electric power which heretofore could not be recovered mostly by the storage battery only. Thus, energy balance can be made highly efficient. And, the temperature of the air blown from the interior heat exchanger because of the aforementioned operation is raised, and heating can be completed quickly and at high efficiency. Since the refrigerant is evaporated easily and completely by the exterior heat exchanger, lowering of the evaporating capacity due to adhesion of frost and a puddle of the refrigerant can be prevented, and the speed of the air blower can be reduced. As a result, the electric power of the storage battery used by the air conditioner can be saved, and the waste consumption of the storage battery can be avoided. Therefore, an electric motor vehicle whose mileage per charge is improved and which is provided with an air conditioner system having a high total energy efficiency can be provided.

Figure 8:
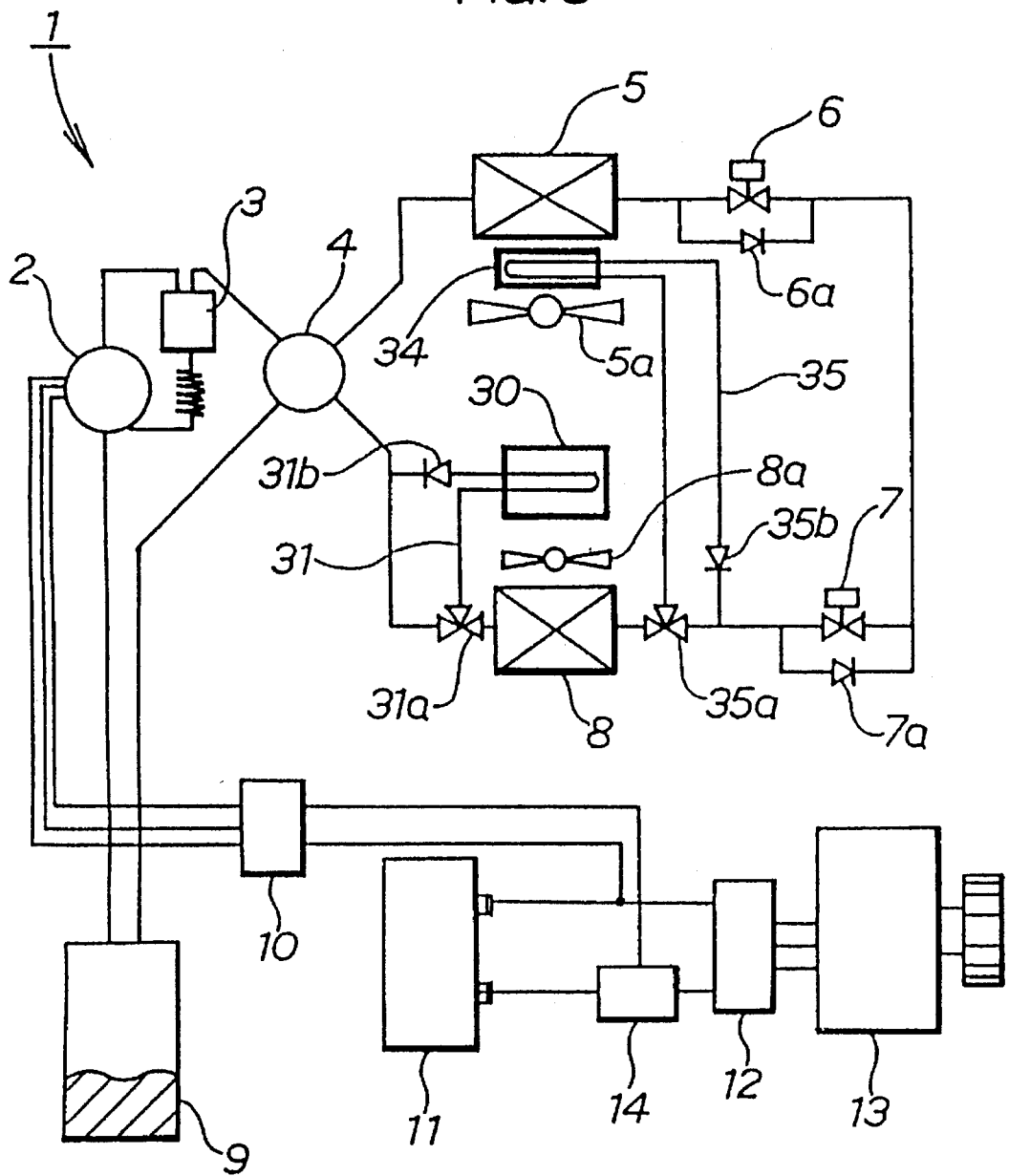

A fourth embodiment of the invention will be described with reference to FIG. 8. FIG. 8 shows the entire structure of the air conditioner 1 of the electric motor vehicle of this embodiment. As shown in FIG. 8, the air conditioner 1 has the same basic structure as described in the third embodiment, and the same equipment are given the same reference numerals. And, the electric power distribution operation when the regenerative electric power is detected by the regenerative electric power detector 18 provided on the electric power distribution device 14 and the control of the rotational frequency of the motor built in the compressor 2 are the same as in the third embodiment.

And, a difference from the above embodiment is that a dual-circuit heat accumulating means is provided. Specifically, the cabin heat accumulating means 30 is disposed on the air intake side of the interior heat exchanger 8, and an exterior heat accumulating means 34 on the air intake side of the exterior heat exchanger 5, respectively. The bypass pipe 31 for leading the refrigerant into the cabin heat accumulating means 30 is connected via the three-way valve 31a and the check valve 31b which are disposed on the pipe on the four-way valve side of the interior heat exchanger 8. Further, a bypass pipe 35 for leading the refrigerant into the exterior heat accumulating means 34 is connected via the three-way valve 35a and the check valve 35b which are disposed on the pipe on the expansion valve side of the interior heat exchanger 8.

The heat exchange cycle for the heating operation in this embodiment will be described. The flow of the refrigerant in the heat exchange cycle and the cabin heating method by the air conditioner 1 when the vehicle is running normally are the same as in the above embodiment. And, the control of an increase of the rotational frequency of the compressor 2 according to an excessive charging quantity to the storage battery 11 when the electric power distribution device 14 detects the regenerative electric power is also the same as in the third embodiment. Therefore, in the same way as the heating operation in the third embodiment, the flow rate of the refrigerant circulated during the heat exchange cycle increases and the heating capacity is increased, but the air quantity by the air blower 8a for preventing over-heating is kept constant or reduced, and an increased portion of the flow rate of the refrigerant is not cooled and discharged in a gaseous state from the interior heat exchanger 8.

In this case, switching of the refrigerant passage by the three-way valve 35a leads the refrigerant to the exterior heat accumulating means 34 through the bypass pipe 35, and the condensed heat of the remaining gas refrigerant is accumulated in the exterior heat accumulating means 34. The refrigerant thoroughly cooled by the exterior heat accumulating means 34 is returned to the principal pipe through the check valve 35b, passed through the check valve 7a in the forward direction, detoured around the expansion valve 7, passed through the expansion valve 6 by the operation of the check valve 6a to be decompressed appropriately, and sent to the exterior heat exchanger 5. And, in the exterior heat exchanger 5, the rotating speed of the air blower 5a is suitably controlled to make sufficient heat exchange with the open air to evaporate the refrigerant, which is then passed through the four-way valve 4 and the accumulator 9, and taken into the compressor 2.

Repeating the above heat exchange cycle makes the exterior heat accumulating means 34 gradually hold a large quantity of heat. As a result, higher temperature air than when the vehicle is running normally is sent to the exterior heat exchanger 5 by the air blower 5a, a temperature difference form the evaporating temperature of the gas-liquid refrigerant increases, making the evaporation of the refrigerant easy. Specifically, the steep decrease of the refrigerant evaporating load in the exterior heat exchanger 5 makes it unnecessary to decrease to an extremely low evaporating temperature as in the prior art, and the blowing air quantity by the air blower 5a can be reduced significantly. Thus, the power consumption is reduced and the total energy efficiency is improved, making it possible to extend a mileage per charge and the service life of the storage battery 11.

In the heat exchange cycle in cooling operation in this fourth embodiment, excepting a state that the bypass pipe 35 is out off from the principal pipe of the heat exchange cycle by the three-way valve 35a, the accumulation of excessive cool at regenerating into the cabin heat accumulating means 30, the improvement of the cooling capacity by the heat accumulation and its effect, and the reduction of the power consumption by the air conditioner 1 by controlling the rotational frequency of the compressor 2 and its effect are the same as in the third embodiment.

The third and fourth embodiments can be realized to operate in the heat exchange cycle of the same air conditioner. Specifically, when the regenerative brake operates during the heating operation of the air conditioner, the refrigerant which cannot be condensed is supplied to the cabin heat accumulating means 30 and the exterior heat accumulating means 34 to enhance the heating of the cabin interior and, at the same time, to accelerate the evaporation of the refrigerant in the exterior heat exchanger 5. Therefore, the power consumption by the compressor 2 and the air blowers 5a, 8a can be reduced, and the air conditioning system with higher energy efficiency can be obtained.

The same effect as described above can be attained by configuring the bypass pipe 35 of the exterior heat accumulating means 34 so that the refrigerant on the inlet side of the interior heat exchanger 8 can be introduced, and by directly introducing the compressed refrigerant into the exterior heat accumulating means 34 according to the same control of the refrigerant supply according to the detection of the regenerative electric power as described above.

And, the same effect can be obtained by providing another heat exchanger instead of the heat accumulating means to conduct the aforementioned control operation by the above heat exchanger.

Furthermore, even when the air conditioner is not being operated, the air conditioner is operated only for the recovery of the regenerative electric power to consume excessive regenerative electric power as the driving electric power for the compressor and the air blower, and the blowing is controlled to discharge the hot or cool air of the interior heat exchanger from the cabin. Thus, it can be used not only for the heat exchange cycle to recover and use the regenerative electric power, but also for protecting the storage battery, and further used as a discarding means of the regenerative electric power which reinforces the regenerative brake.

As described above, this invention, in the electric motor vehicle which is provided with the air conditioner and the electric power distribution device using a motor as the driving source, disposes the heat accumulating means for introducing the refrigerant at either the outlet or inlet side of the interior heat exchanger on the interior heat exchanger, or disposes the heat accumulating means for introducing the refrigerant at either the outlet or inlet side of the interior heat exchanger of the exterior heat exchanger, and provides a control device for supplying the refrigerant to the respective heat accumulating means in the form of a refrigerant passage control valve which operates according to the detection of the regenerative electric power of the electric power distribution device. Thus, when the regenerative brake is operated due to deceleration when the air conditioner is operating, the electric power distribution device cuts off the storage battery and the motor completely or appropriately to utilize all or part of the regenerative electric power as the compressor driving power of the air conditioner, And, the quantity of heat corresponding to the excess portion of cooling and heating is accumulated in the heat accumulating means and used to adjust or improve the cooling and heating capacity in the cabin, or used as the heat of evaporation of the refrigerant in the heat exchange cycle in winter, thereby making it possible to effectively use without waste the regenerative electric power which heretofore could not be recovered mostly by the storage battery only. Thus, energy balance can be made highly efficient. And, the temperature of the air blown from the interior heat exchanger by the aforementioned operation is raised, and the cabin heating can be completed quickly and at high efficiency, thereby improving the air conditioning environment. Since the refrigerant is evaporated easily and completely by the exterior heat exchanger, lowering of the evaporating capacity due to adhesion of frost and a puddle of the refrigerant can be prevented, and the rotating speed of the air blower can be reduced by lowering the blowing air quantity. As a result, the electric power of the storage battery used by the air conditioner can be saved, and the waste consumption of the storage battery can be avoided. Therefore, an electric motor vehicle whose mileage per charge is improved and which is provided with an air conditioner having a high total energy efficiency can be provided.

Figure 9:
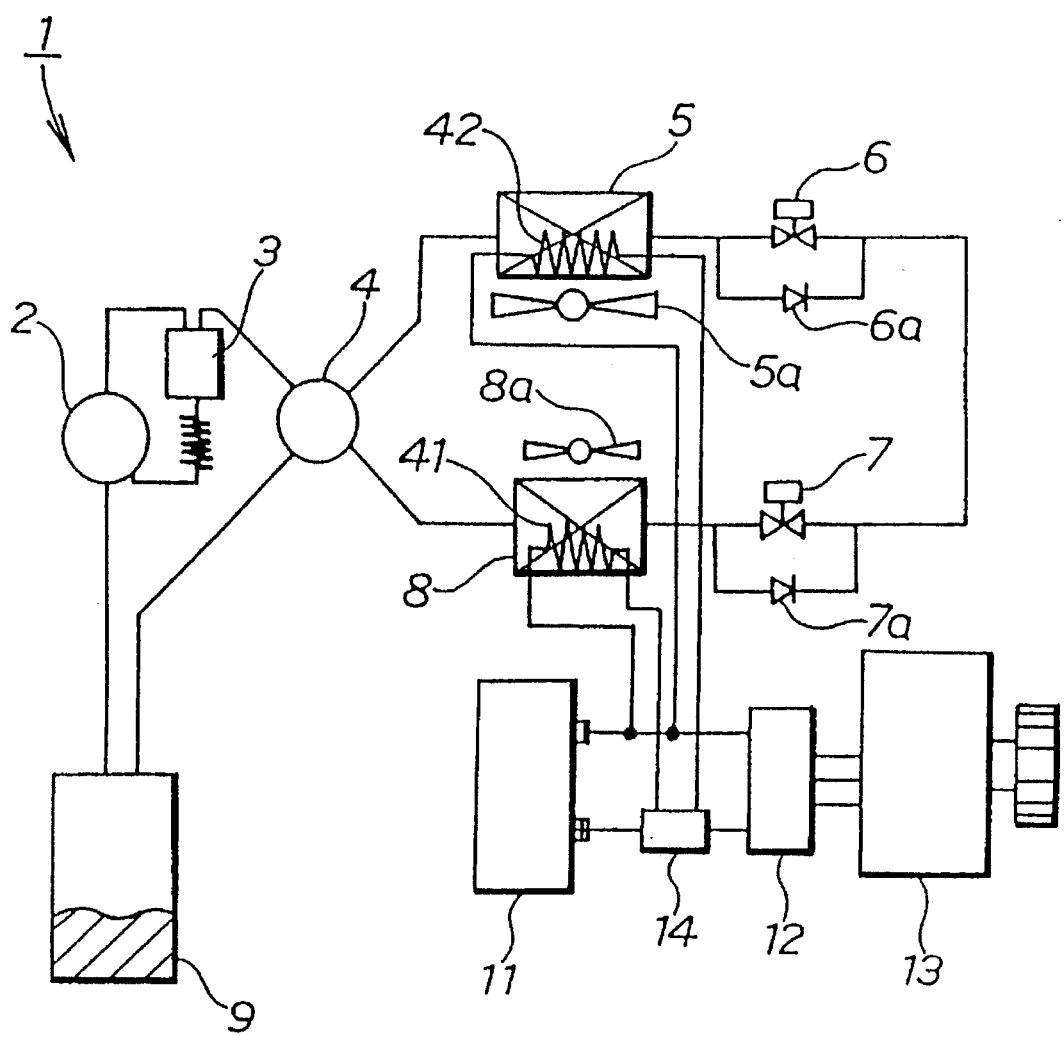
Figure 10A:
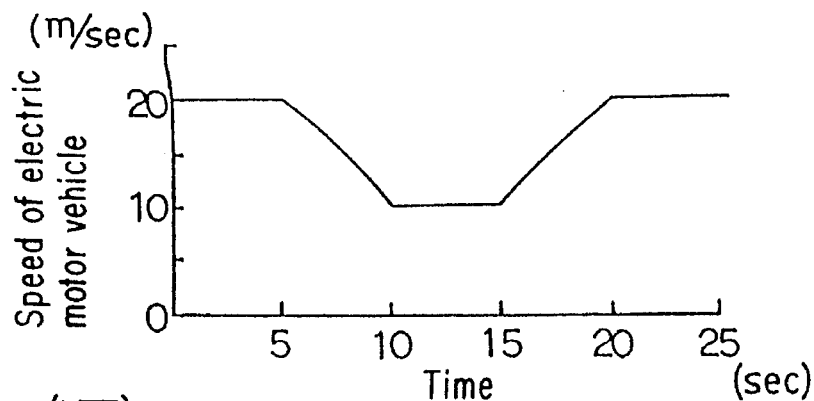
Figure 10B:
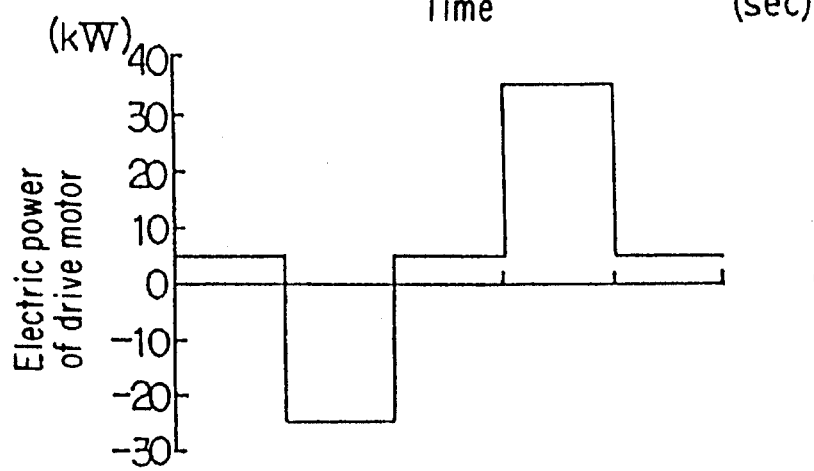
Figure 10C:
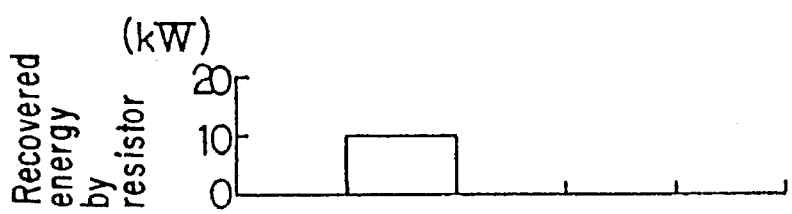
Figure 10D:
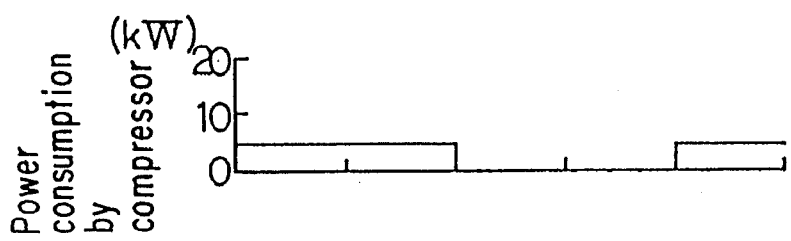
Figure 10E:
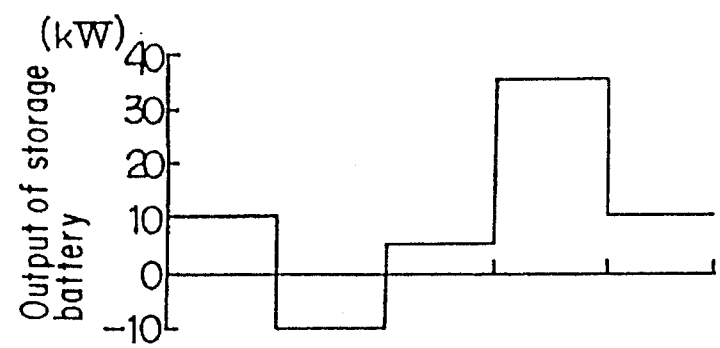

A fifth embodiment of this invention will be described with reference to FIG. 9. FIG. 9 shows the entire structure of the air conditioner 1 used for the electric motor vehicle of this embodiment. The air conditioner 1 consists in the following order of the compressor 2 connected by piping, the oil separator 3, the four-way valve 4, the exterior heat exchanger 5, two pairs of expansion valves 6, 7, the interior heat exchanger 8, and the accumulator 9. And, when this air conditioner 1 is operating, the refrigerant is forcedly fed by the compressor 2, and circulated in the forward or reverse direction within these equipment according to the switching operation of the four-way valve 4 according to the cooling or heating operation of the air conditioner 1.

The compressor 2 is driven by the built-in motor to compress the refrigerant, and the motor receives the electric power from the storage battery 11. And, the storage battery 11 is connected to the drive motor 13 for running the electric motor vehicle through the drive circuit 12, and supplies discharge electric power according to the vehicle speed. Further, the electric power distribution device 14 is disposed between the storage battery 11 and the drive circuit 12. And, when the vehicle is decelerating, the drive motor 13 is temporarily used as the generator to convert kinetic energy for a decelerated speed into electrical energy. Thus, the regenerative brake for recovering the energy as the regenerative electric power is configured.

To recover the heat of the regenerative electric power, two circuits are provided, one is a resistor 41 disposed within the interior heat exchanger 8, and the other is a resistor 42 disposed within the exterior heat exchanger 5. The connection terminal of at least one of these resistors 41, 42 can be connected to the drive circuit 12 of the drive motor 13 through the electric power distribution device 14 but not directly connected to the storage battery 11.

The electric power distribution device 14 is provided with the regenerative electric power detector 18 and operates only when the air conditioner 1 is in the heating operation mode. Specifically, when the air conditioner 1 is operating in the heating mode and the electric motor vehicle is running normally, the storage battery 11 is connected with the drive circuit 12, while the resistors 41, 42 are cut off from the storage battery 11 and the drive circuit 12. In this case, when the regenerative brake operates to generate regenerative electric power to decelerate the electric motor vehicle, the regenerative electric power is detected by the regenerative electric power detector 18 of the electric power distribution device 14. And, the electric power distribution device 14 outs off the storage battery 11 and the drive circuit 12, and connects at least one of the resistors 41, 42 with the drive circuit. Thus, excess regenerative electric power can be recovered as heat into the heat recovery circuits.

When the air conditioner 1 is in the heating mode, the steam refrigerant under high-temperature and high-pressure conditions after being compressed by the compressor 2 and having an oil separated by the oil separator 3 is sent to the interior heat exchanger 8 by the four-way valve 4. And, in the air conditioner 1 when the vehicle is running normally, the cabin is heated by effecting the heat exchange with the air in the cabin only by the condensed heating value of the compressed refrigerant in the interior heat exchanger 8, so that the compressed refrigerant is cooled into a liquid refrigerant. And, when the regenerative brake operates, the regenerative electric power generated by the drive motor 13 is sent to at least one of the resistors 41 and 42 through the electric power distribution device 14, and the resistors 41 and 42 generate heat to heat the interior heat exchanger 8 or the exterior heat exchanger 5.

The resistor 41 on the heat recovery circuit disposed on the interior heat exchanger 8 is specifically attached to the pipe at the refrigerant inlet section of a heat exchange section or the interior heat exchanger 8. In the above configuration, the heat exchange section of the interior heat exchanger 8 is gradually heated by the heat obtained by converting the regenerative electric power, and the compressed refrigerant to be introduced into the interior heat exchanger 8 is heated, so that the compressed refrigerant has a temperature higher than when discharged from the compressor 2, and enthalpy is raised. Thus, the air to be sent into the interior heat exchanger 8 is heated more than when the vehicle is running normally, and a temperature of the air blown out by the interior heat exchanger 8 into the cabin rises to improve the heating capacity of the air conditioner 1.

In this case, the rotating speed of the motor which drives the compressor 2 in the air conditioner 1 is generally controlled according to the cabin temperature. As described above, since the heating capacity is improved by using the regenerative electric power for the air conditioner 1, when the heating capacity improving effect is attained, the motor of the compressor 2 can be temporarily stopped or its rotating speed can be lowered. Thus, excessive heating of the cabin is prevented, and the power consumption by the air conditioner 1 is temporarily reduced, thereby making it possible to lower the discharge output value of the storage battery after regeneration. As a result, a mileage per charge can be extended, and the service life of the storage battery 11 can be improved.

The refrigerant which is cooled and liquefied by the heat exchange in the interior heat exchanger 8 is detoured around the expansion valve 7 by the check valve 7a, and sent to the exterior heat exchanger 5 through the expansion valve 6. In other words, the refrigerant is inevitably passed through the expansion valve 6 by the check valve 6a, appropriately decompressed into a gas-liquid refrigerant at a low temperature, and sent to the exterior heat exchanger 5.

In this case, the exterior heat exchanger 5 has the resistor 42 attached in the same way as the resistor 41 of the interior heat exchanger 8 described above. And, when the regenerative brake is operated, excess regenerative electric power is supplied to the resistor 42. Heat generated by the resistor 42 gradually heats the heat exchange section of the exterior heat exchanger 5 or the refrigerant pipe lead to the exterior heat exchanger 5. Therefore, the gas-liquid refrigerant in the exterior heat exchanger 5 is evaporated easily and completely. Thus, since an evaporation load of the main body of the exterior heat exchanger 5 can be reduced significantly, an extremely low evaporation temperature as in the prior art is not needed, and the air quantity by the air blower 5a can be also reduced significantly. Accordingly, the total electric power of the storage battery consumed by the air conditioner 1 can be saved.

Lastly, the heat-exchanged refrigerant is passed through the four-way valve 4 and the accumulator 9, and returned to the compressor 2, thereby restarting the circulation cycle.

The electric power distribution device 14 may be provided with the terminal voltmeter 23 of the storage battery or the storage battery remaining capacity meter 11a as a charging state monitoring device to judge an allowable regenerative electrical energy to the storage battery. Thus, when a discharge voltage of the storage battery is lower than a prescribed voltage, charging is made by the regenerative electric power, and when it is higher, the regenerative electric power can be distributed to the resistors 41, 42 of the heat recovery circuit.

Furthermore, the distribution of the regenerative electric power to the resistors 41, 42 of the heat recovery circuit can be set voluntarily by changing the resistance values of the resistors and by changing an electrifying time by the addition of a switch or the like.

Now, the energy balance of the electric motor vehicle of this embodiment will be described with reference to FIG. 10. In FIG. 10, (a) shows a speed of the electric motor vehicle, (b) shows electric power consumed/outputted by the drive motor, (c) shows the recovered energy by the resistor, (d) shows the electric power consumed by the compressor, and (e) shows the discharged/outputted electric power of the storage battery. In these figures, the horizontal axis shows time common to these figures. First, as shown in FIG. 10 (a), when the electric motor vehicle runs at the same speed as in the prior art of FIG. 5, the output of the drive motor shown in FIG. 10 (b) includes 5 kW when running at a constant speed, –25 kW when decelerating, and 35 kW when accelerating.

The generated electric power by the drive motor when the vehicle is decelerating is greater than in the prior art, because total kinetic energy to be reduced when decelerating is converted into electrical energy and absorbed. In other words, of the converted electrical energy, excess electrical energy which cannot be recovered by the storage battery is accumulated as heat energy in the interior heat exchanger or the exterior heat exchanger by means of the resistor. And, the charging quantity into the storage battery when regenerating is limited to electrical energy of 15 kW which does not put an extra strain on the storage battery in the same way as in the prior art. As a result, to improve the heating capacity of the air conditioner, the compressor of the air conditioner can be stopped temporarily after the completion of deceleration. Therefore, the discharge output of the storage battery is lowered corresponding to the consumed electric power of the compressor which is stopped temporarily, and the power consumption is reduced for a given time, reducing an integral. And, it is known as the characteristics of the storage battery that high current discharge has adverse effects such as shortening the service life and lowering a discharge efficiency. Such high current discharge is required to accelerate the vehicle immediately after decelerating which is often used in the general running conditions of the electric motor vehicle. But, as shown in FIG. 10 (e), the present invention does not require the power consumption by the compressor and reduces a burden applied to the storage battery, providing the storage battery with remarkable effects of a high discharge efficiency and a long service life.

As described above, this embodiment, in the electric motor vehicle which is provided with the air conditioner and the drive motor driven by the electric power from the storage battery, provides the motor and at least one of the interior heat exchanger and the exterior heat exchanger with a resistor, the heat recovery circuit with the above resistor connected to the electric power distribution device for distributing the electric power from the storage battery, and the regenerative electric power detecting device or the charging state monitoring device of the storage battery on the electric power distribution device. Therefore, when the regenerative brake is operated with the air conditioner operated for heating, the storage battery and the motor are cut off completely or appropriately, all or part of the regenerative electric power generated by the regenerative brake is converted into heat by the resistor in the cabin to heat the interior heat exchanger, thereby improving the cabin heating capacity, or supplying the heat by a resistor located outside the cabin to the exterior heat exchanger which operates as a refrigerant evaporating means in the heat exchange cycle for heating to accelerate the evaporation of the refrigerant. As a result, the regenerative electric power which heretofore could not be recovered mostly by the storage battery only can be used effectively without waste, attaining highly efficient utilization of energy as the entire electric motor vehicle. And, the temperature of the air blown from the interior heat exchanger by the aforementioned operation is raised, and the cabin heating can be made quickly and efficiency. Since the refrigerant is evaporated easily and completely by the exterior heat exchanger, lowering of the evaporating capacity and the heating capacity due to adhesion of frost and a puddle of the refrigerant can be prevented. At the same time, efficiency and reliability are enhanced by significantly reducing the air quantity by a fan, so that the electric power of the storage battery consumed by the air conditioner can be saved, and the waste consumption of the storage battery can be avoided. Thus, a mileage per charge can be extended by the effective utilization of the regenerative electric power. As a result, an electric motor vehicle provided with a heating system having a high total energy efficiency can be obtained.

And, of the regenerative electric power generated by the regenerative brake, charging electric power according to the consumed state of the storage battery at that point can be always assigned to the storage battery, so that the storage battery can be preserved and protected, its service life can be elongated, and the charging and discharging capacity can be maintained.

Industrial Application

As described above, this invention can realize an air conditioner which saves the power consumption of a storage battery and operates at a high efficiency by using the regenerative electric power of a regenerative brake. Thus, it is suitable for an electric motor vehicle which is provided with the regenerative brake and the air conditioner.

We claim:

1. An electric motor vehicle provided with a drive motor driven by electric power from a storage battery, an air conditioner, and a regenerative brake means which temporarily uses the motor as a generator when decelerating the vehicle to generate regenerative electric power and to charge the storage battery comprising:

an excess regenerative electric power judging means for judging excess regenerative electrical energy based on regenerative electrical energy by the regenerative brake and allowable regenerative electrical energy of the storage battery when the regenerative brake is operating, and an electric power distribution means for distributing the excess regenerative electric power to the air conditioner based on the excess regenerative electrical energy.

2. An electric motor vehicle according to claim 1, wherein the operation of the air conditioner temporarily comes to a halt or is reduced subsequent to enhancement of an air conditioning capacity according to the electric energy supplied by said electric power distribution means.

3. An electric motor vehicle according to claim 1, wherein said excess regenerative electric power judging means judges the allowable regenerative electrical energy based on a voltage input from the storage battery terminal.

4. An electric motor vehicle according to claim 1, wherein said excess regenerative electric power judging means judges the allowable regenerative electrical energy based on the input from a remaining capacity detecting means provided on the storage battery.

5. An electric motor vehicle according to claim 1 further comprising a heat accumulating means for absorbing a refrigerant at either a refrigerant inlet side of outlet side of an interior heat exchanger of the air conditioner.

6. An electric motor vehicle according to claim 1 further comprising a heat accumulating means for absorbing a refrigerant at either a refrigerant inlet side of outlet side of an exterior heat exchanger of the air conditioner.

7. An electric motor vehicle according to claim 5 or 6, wherein the supply of the refrigerant to the heat accumulating means is switched according to the instructions by the excess regenerative electric power judging means.

8. An electric motor vehicle which is provided with a drive motor to be driven by the electric power from a storage battery, an air conditioner, and a regenerative brake means which temporarily uses the motor as a generator when decelerating the vehicle to generate regenerative electric power and to charge the storage battery comprising:

an excess regenerative electric power judging means for judging excess regenerative electrical energy based on regenerative electrical energy by the regenerative brake and allowable regenerative electrical energy of the storage battery when the regenerative brake is operating, and an electric power distribution means for distributing the excess regenerative electric power to a heat recovery circuit based on the excess regenerative electrical energy.

9. An electric motor vehicle according to claim 8, wherein said heat recovery circuit is an electric heating means disposed on at least one of an interior heat exchanger or an exterior heat exchanger of the air conditioner.

10. An electric motor vehicle according to claim 8, wherein said heat recovery circuit is a hot-water supplying device.

11. An electric motor vehicle according to claim 8, wherein said heat recovery circuit is a hot-water supplying device, and a radiation heating device for heating by the hot water supplied by said hot-water supply device is provided.

12. An electric motor vehicle according to claim 1 or 8, wherein said excess regenerative electric power is used as electric power for the electrical leg-power auxiliary equipment for a foot braking device.

13. An electric motor vehicle according to claim 1 or 8, wherein said excess regenerative electric power is used as a drive power source for a cooling device which cools the foot braking device.

* * * * *